United States Patent [19]

Caldon

[11] 4,084,961

[45] Apr. 18, 1978

[54] TREATMENT OF METAL BEARING MINERAL MATERIAL

[75] Inventor: Frank Caldon, Thompson Falls, Mont.

[73] Assignee: Sunshine Mining Company, Kellogg, Id.

[21] Appl. No.: 722,194

[22] Filed: Sep. 10, 1976

[51] Int. Cl.$^2$ ............... C22B 15/08; C22B 11/04
[52] U.S. Cl. .................... 75/101 R; 75/115; 75/117; 75/118 R; 75/120; 75/121; 75/109; 423/41
[58] Field of Search .............. 75/115, 101 R, 117, 75/118 R, 120, 121, 109; 423/41

[56] References Cited

U.S. PATENT DOCUMENTS

| | | | |
|---|---|---|---|
| 814,294 | 3/1906 | Just | 75/118 R X |
| 820,000 | 5/1906 | Just | 75/115 X |
| 3,107,977 | 10/1963 | Borvali et al. | 75/115 X |
| 3,793,429 | 2/1974 | Queneau et al. | 75/118 R |
| 3,888,748 | 6/1975 | Brennecke | 75/101 R X |
| 3,910,636 | 10/1975 | Hard | 75/101 R X |
| 3,933,478 | 1/1976 | Moore | 75/115 X |

*Primary Examiner*—G. Ozaki
*Attorney, Agent, or Firm*—Arthur A. March

[57] ABSTRACT

Pressure leaching metal bearing mineral material such as silver and copper bearing mineral material, e.g. sulfide and/or oxide, with an aqueous liquid containing sulfuric acid and very low concentration nitric acid under oxygen pressure, to dissolve out the corresponding desired metal values from such mineral material with nitric acid regeneration;

acid pretreatment of such metal bearing mineral material by preliminary leaching with an aqueous liquid containing sulfuric acid and very low concentration nitric acid under normal ambient pressure, to dissolve substantially attendant acid soluble metal carbonate values, e.g. manganese carbonate, from said mineral material without dissolving the desired metal values;

and after treatment of the pressure leached aqueous liquid where it contains silver values as desired metal values dissolved from such mineral material, by contact with metallic copper in a closed system under autogenous steam pressure to reduce the remaining nitric acid values to gaseous form for removal from the system and to effect simultaneously by displacement both silver metal deposition or cementation from said aqueous liquid and copper metal dissolution into said aqueous liquid.

20 Claims, No Drawings

TREATMENT OF METAL BEARING MINERAL MATERIAL

The present invention relates to and has among its objects the treatment of metal bearing mineral material for the recovery of desired metal values, such as silver and copper, therefrom, and more particularly to the leaching of such metal bearing mineral material with an aqueous liquid containing very low concentration nitric acid significantly below those minimum levels heretofore considered necessary, with nitric acid regeneration, for surprising economy of operation.

According to the invention, the main leaching is carried out under relatively mild oxygen pressure and temperature conditions with sulfuric acid and very low concentration nitric acid in such a way that there is a significant saving in nitric acid requirements while maintaining overall process efficiency. An optional acid preleaching step is also contemplated to remove certain unwanted readily acid-leachable constituents which may be present in the core material in essence without also prematurely leaching out the desired metal values to be recovered. This step accomplishes its purpose with minimum indigenous attention to regeneration and disposal of the preliminary leach liquid. A versatile after-treatment is also contemplated to recover silver from the leaching solution by cementation. Full use of the various treating liquids is contemplated.

Ore materials particularly applicable to treatment according to the invention include, for example, milled ore concentrates obtained by flotation separation such as those containing one or more of the desired metals such as silver, copper, zinc, and mercury, perhaps along with lead, bismuth, arsenic, antimony, manganese and iron, for instance in sulfide and/or oxide form, and in particular tetrahedrite type ores possibly including associated siderite therewith.

Because of present day emphasis on minimizing pollution of the earth and the atmosphere and more acute awareness of energy conservation as an industrial reality, metal recovery processes which involve ore roasting techniques have become less desirable than heretofore. As an alternative, the lixiviation or leaching of metal bearing mineral material by hydrometallurgical technique is considered more appropriate since roasting gases, in which polluting constituents such as sulfur dioxide predominate, are not normally formed.

However, even ore leaching techniques, as so far provided by the art, suffer from certain drawbacks. Among these is the attendant expensive consumption of leaching agents, expecially acid and oxidant, i.e. where soluble salts are to be formed of the desired metal values by the action of oxidizing acid, such as nitric acid, and oxygen on the metal bearing mineral material. In order to obtain more efficient recovery of the desired metal values during the main leaching, the ore is sometimes pretreated to remove unwanted constituents. Where such pretreatment involves roasting steps, the above stated disadvantages must be similarly considered. Where such pretreatment involves hydrometallurgical steps, expensive consumption of treatment agents and problems of their disposal are often involved which when added to the energy and equipment requirements significantly detract from the overall economy of the system used. Moreover, once the desired metal values have been leached from the mineral material, for instance by an acid leaching treatment, these metal values must be separately recovered and the remaining leaching solution containing acid values and perhaps residual metal values must be disposed of or regenerated for recycling. Such recovery and work-up add to the overall treatment cost.

In particular, one obvious disadvantage of acid treating under pressure a metal containing material, whether sulfide, oxide or mixture, in which any of the desired metals are associated with carbonates, is the substantial pressure developed by the release of carbon dioxide gas. Carbon dioxide always develops in such instance where an acid reacts with a material of carbonate nature. Very often metal mines yield ores, particularly those involving silver, copper, zinc, lead, antimony and the like, in which the valuable metals are associated geologically with siderite (iron carbonate). In fact, copper, lead and zinc are often found chemically combined with carbonate, throughout the mining world. In the flotation treatment of these ores, metals combined as carbonates very often concentrate with the sulfide or oxide flotation product.

Hence, the treatment of such flotation concentrates or like by acid leaching under oxygen pressure in closed pressure vessels results in the need for additional oxygen pressure sufficient to counterbalance that partial pressure generated by released carbon dioxide gas. The end result is more elaborate leaching equipment, slower reaction rates, incomplete leaching as well as increased consumption of acid.

ACID PRETREATMENT

In accordance with one feature of the present invention, the foregoing problems are overcome by acid pretreating the metal bearing mineral material, e.g. mill concentrate or the like, by preliminary leaching with an aqueous liquid containing about 30–120 g/l of sulfuric acid and about 0.05–1.5 g/l of nitric acid in an open system or vessel at ambient or normal pressure. This acid pretreatment in an open vessel serves to dissolve substantially the entirety of attendant acid soluble metal carbonate values from the mineral material prior to the main pressure leaching step.

Generally, this preliminary leaching is effected at about 20°–100° C for about ¼ to 3 hours, preferably at about 50°–100° C for about ½ to 2 hours, and in particular at about 90°–100° C for about 1 hour. The time and temperature will vary inversely since as the temperature is increased the reaction rate will generally increase as well.

The weight ratio of mineral material solids to aqueous liquid used is generally between about 0.05–0.5:1 (or 1:2–20). This ratio will depend upon the amount of material present which will react with the acid under the particular reaction conditions selected and upon the ability of the aqueous liquid as solvent to hold the reacted metal or metals in solution. It can even reach pulp concentrations of about 5–40% solids (i.e. solids to aqueous liquid weight ratio of 0.05–0.7:1 or 1:1.5–19). However, a preferred weight ratio of mineral material solids to aqueous liquid is about 0.25:1 (or 1:4), i.e. about 20% solids content.

The 30–120 g/l $H_2SO_4$ range corresponds to an acid concentration of about 3–11% by weight $H_2SO_4$ and the 0.05–1.5 g/l $HNO_3$ range corresponds to an acid concentration of about 0.005–0.15% by weight $HNO_3$. These acids are thus used in a weight ratio of sulfuric acid to nitric acid of about 20–2400:1 (and in turn in a molar ratio of about 12.6–1530:1). The higher nitric acid levels favor reprecipitation of antimony if this metal is present and tends otherwise to dissolve. The preferred nitric acid concentration range is about 0.1–1.5 g/l $HNO_3$ which corresponds to about 0.01–0.15% by weight $HNO_3$.

Besides overcoming the problems of providing more elaborate leaching equipment, and contending with slower reaction rates, incomplete leaching and increased acid consumption in the subsequent intended pressure leaching step for recovery of the desired valuable metal values, as noted above, the acid-pretreatment step of the present invention also serves another purpose. This is to remove any manganese present, e.g. in the form of carbonate, as well as other so-called trash metals such as iron which may occur as carbonates. Manganese, as the artisan will appreciate, is extremely difficult to handle in a copper electro-winning circuit, and its preliminary removal avoids problems where copper is one of the metal values, as is often the case, dissolved from the solids phase in the subsequent pressure leaching step, and which is later to be recovered by electrowinning techniques.

Naturally, where the flotation concentrate or the like to be subjected to pressure leaching does not contain carbonates or other undesired acid soluble metals under the acid pretreatment reaction conditions intended, and particularly manganese, the preliminary leaching step may be by-passed. This acid pretreatment step is particularly useful in the case of tetrahedrite ore concentrate hydrometallurgical processing such as where silver values in addition to manganese or other carbonate are present along with copper and antimony sulfides and/or oxides, and perhaps lead, zinc, mercury, arsenic, and/or bismuth values as well.

The acid pretreatment step furthermore serves preliminarily to adjust the sulfur content of sulfide type ores to bring the same more closely to the correct requirements for reacting with particular metals during the subsequent pressure leaching step. In addition, if carbonates are in prominent proportion in the mineral material to be treated, the acid pretreatment step, as aforesaid, will serve to decompose such carbonates, releasing their carbon dioxide content into the open system, e.g. the air over an open leaching vessel, so that foaming and gassing from this source will be significantly avoided during the subsequent closed system pressure leaching step, since carbon dioxide present in perceptible quantities during the pressure leaching step drastically increases the reaction time. Nevertheless, under the mild temperature and normal atmospheric pressure conditions contemplated for the acid pretreatment, no silver, zinc, mercury, lead, bismuth or arsenic, which may be present in the ore material, are dissolved out and only slight amounts of copper and antimony are leached along with the intended essentially complete manganese and partial iron leaching.

It is completely surprising that a mixed sulfuric acid-nitric acid leaching without pressure can be used for carbonate removal, yet not disturb the remaining desired metal values to be later recovered nor unduly consume the acid content of the acid pretreatment liquid. Moreover, to the extent that iron is concomitantly removed by such pretreatment, the amount of oxygen needed to precipitate such iron as $Fe_2O_3$ in the subsequent pressure leaching step will be correspondingly conserved. The instant pretreatment step of course avoids the significantly increased consumption of valuable nitric acid normally attendant the later pressure leaching step when carried out without such pretreatment. It is also advantageous that the residual liquid from the main pressure leaching-oxidation step, after recovering the desired metal values therefrom can be used as the acid pretreatment liquid, thus minimizing the volume of liquid which must eventually be discarded from the operation. Such residual liquid is particularly preferred for the acid pretreatment step where it contains for instance in accordance with one feature of the invention about 55–75 g/l of sulfuric acid and about 0.4–0.6 g/l of nitric acid, and a solids to aqueous liquid ratio of about 0.26:1, and, the pretreatment is carried out at about 80°–90° C.

PRESSURE LEACHING

In accordance with a basic feature of the present invention, a process is provided for recovering acid leachable metal values from metal bearing mineral material which comprises pressure leaching such metal bearing mineral material with an aqueous liquid containing about 50–260 g/l of sulfuric acid and about 0.5–5.0 g/l of nitric acid under oxygen pressure to dissolve such acid leachable metal values from said mineral material into the aqueous liquid. Generally, such pressure leaching is effected at about 90°–180° C for about ½ to 4 hours, preferably at about 150° C for about 2 hours.

The pressure leaching is effected in a closed system under an oxygen pressure of about 10–50, and preferably 15–40, psig (pounds per square inch gage) in excess of autogenous steam pressure. Such oxygen pressure is thus a partial pressure or an overpressure, and represents that part of the total pressure in the closed system, e.g. autoclave, in addition to the partial pressure of the steam generated under the temperature conditions involved, as the artisan will appreciate. The oxygen used may be from any appropriate source.

Total leaching pressure, i.e. that created by the steam and oxygen gas, has been found to be generally about 15–30 or 15–35 psig higher than that created by steam at the operating conditions. For instance, at 150° C steam in a closed system exerts a pressure of around 55 psig. Thus, proper operating conditions for the pressure leach would include typically, at about 150° C, a total pressure of about 90 psig. This would be made up of about 15 psig oxygen gas (oxygen overpressure) and 55 psig steam. The contemplated free oxygen pressure or over-pressure within the 10–50 psig range, e.g. 15–40, preferably 15–35, psig, is sufficient to provide during the pressure leach a reasonably rapid rate of oxidation without introducing excessive pressure and the need for elaborate high pressure equipment. In general, the total pressure may be about 45–140, or 50–130 psig, of which about 10–50 psig may be the oxygen overpressure.

The weight ratio of mineral material solids to aqueous liquid used for the pressure leaching step is generally between about 0.03–0.4:1 (or 1:2.5–33.3). This ratio will be largely dictated by the amount of silver in the material to be treated, and specifically the amount of silver which dissolves into solution. As is known, silver sulfate is much less soluble than copper sulfate in aqueous solution. Mineral materials containing little silver therefore can be leached at a much higher percent solids than those containing higher amounts of silver. In any event, mineral materials containing silver are never leached in a fashion which will impart to the dissolving solution a silver concentration generally in excess of about 7–8 g/l, and preferably will not impart a silver concentration thereto in excess of about 5 g/l. A preferred weight ratio of mineral solids to aqueous liquids is about 0.1:1 (or 1:10).

The 50-260 g/l $H_2SO_4$ range corresponds to an acid concentration of about 5-26% by weight $H_2SO_4$ and the 0.5-5 g/l $HNO_3$ range corresponds to an acid concentration of about 0.05-0.5% by weight $HNO_3$. The nitric acid concentration according to the invention is extremely low from an absolute stand point as well as from its amount as compared to the amount of sulfuric acid used. It is indeed highly surprising that the extremely favorable results according to the present invention could have occurred in the light of the very low concentration of nitric acid used during the pressure leaching step. Amounts in the order of 0.5-5.0 g/l or 0.05-0.5% by weight nitric acid concentration are more akin to catalytic quantities than reaction component quantities of an oxidizing acid.

As compared with the broader weight ratio of sulfuric acid to nitric acid of about 10-520:1 inherently contemplated herein (corresponding to a molar ratio of about 6.4-334.3:1), the narrower weight ratio of about 52-100:1 is preferred, i.e. between 260 g/l sulfuric acid to 5 g/l nitric acid or 52:1 and 50 g/l sulfuric acid to 0.5 g/l nitric acid or 100:1. Particularly preferred is the weight ratio of about 90:1 which corresponds to 180 g/l sulfuric acid and 2.0 g/l nitric acid (i.e. about 0.2% by weight nitric acid).

In any case, the nitric acid concentration is not to exceed 0.5% by weight of the aqueous liquid or pressure leaching medium, i.e. the water content thereof. Stated another way, the $HNO_3$ and $H_2O$ content should provide a theoretical nitric acid solution of at most 0.5% concentration.

With respect to the amount of nitric acid used, it will be seen that where nitric acid is deficient, the percentage of silver dissolved during the pressure leaching is low. On the other hand, too much nitric acid, e.g. amounts above about 5 g/l $HNO_3$ (i.e. above about 0.5% concentration), unduly causes elemental sulfur produced during the pressure leaching to oxidize, then consume oxygen unnecessarily to become sulfuric acid. Naturally, all concentrates require slightly different amounts, but these will be within the very low nitric acid range noted above. Preferred are $HNO_3$ concentrations at the lower end of the stated range, e.g. about 1-3 g/l (0.1-0.3% concentrations).

As to the sulfuric acid levels, the higher the attendant copper and silver, particularly where associated as sulfide, the more sulfuric acid required. In any event, enough sulfuric acid, generally in excess, is included in the system by way of the within stated ranges to provide the needed sulfate ions to combine with all of the cations of the metals which are dissolved during the pressure leaching.

In line with the foregoing, it will be realized that mineral materials containing no silver generally require less heat, pressure and time for satisfactory pressure leaching. Sulfuric acid concentration may be varied generally inversely with the pressure leaching time, i.e as the sulfuric acid concentration is reduced, the leaching time is generally lengthened. Nitric acid concentration may be varied generally inversely with the temperature, i.e. while the maximum temperature (about 180° C) may be reduced, this condition generally calls for an increase in nitric acid concentration, i.e. up to a maximum of about 5 g/l (0.5%). On the other hand, higher temperatures require less nitric acid which in turn means that less elemental sulfur produced during the pressure leaching reaction will tend to oxidize to sulfuric acid and consume valuable oxygen thereby. These observations apply generally where a free oxygen pressure in the range of about 10-50, preferably 15-40, and particularly 15-35 psig, is present, since this is sufficient, as aforesaid, to provide a reasonably rapid rate of oxidation without introducing excessive pressure.

According to a preferred embodiment of the pressure leaching step, the closed system includes about 180 g/l sulfuric acid (about 18% by weight sulfuric acid concentration) and 2.0 g/l nitric acid (about 0.2% by weight nitric acid concentration) in a mineral material to aqueous liquid weight ratio of about 0.1:1, and the leaching is effected at about 150° C for about 2 hours at about 90 psig (35 psig oxygen overpressure and 55 psig steam pressure).

The pressure leaching step of the invention is particularly desirably employed in treating silver bearing mineral material, expecially tetrahedrite and the like, also containing copper, and even antimony, mercury, etc. Moreover, by combining the acid pretreatment step with the pressure leaching step, and for example effecting the pressure leaching step at 150° C with a total pressure of 90 psig, about 90% recovery of silver is obtained. On the other hand, if the acid pretreatment is by-passed, the pressure leaching step for the same mineral material and for the same leaching time must be effected at 150° C with a total pressure of 140 psig, and despite the higher pressure, only about 65% recovery of silver is obtained.

The benefit of such acid pretreatment in combination with the main pressure leaching-oxidation step, according to the invention, is particularly appreciated when it is considered that the acid pretreatment may be carried out even at room temperature (energy conservation), using an open vessel (equipment conservation) supplied with aqueous liquid which is the final liquid from the main pressure leaching-oxidation step after the desired metal values have been recovered therefrom (material conservation). Since the same liquid in effect serves two process steps, overall disposal problems are accordingly minimized (pollution minimization).

As is known, one disadvantage of pressure leaching with an acid solution, e.g. of sulfuric acid, containing no nitric acid is that generally heat in the 175° C range or higher is required. However, at this temperature the elemental sulfur produced is molten and more readily oxidized to $H_2SO_4$ with the resultant drawback of additional oxygen consumption and perhaps even disposal problems regarding excess sulfuric acid. Often occlusion of unreacted metal sulfide (from the ore concentrate) occurs within the molten sulfur and further treatment for recovery of the metal values is necessitated thereby.

By using very low concentration nitric acid with the sulfuric acid according to the invention, the stated problems are avoided yet little nitric acid is present to be consumed. Less heat is required so that the tendency of the elemental sulfur to be oxidized is minimized, and less entrainment occurs because the nitric acid present, even in the essentially catalytic quantities contemplated, insures nearly total decomposition of the metal sulfides which are the usual entrained materials. (In the case of oxides, of course, these form hydroxides generally upon contact with water, but in the acidic solution the corresponding hydroxide is converted to the corresponding sulfate). Hence, by using nitric acid according to the present invention, an elemental sulfur product generally results which is sufficiently free of metal sulfides as to require no further treatment for metal recovery. This sulfur product can generally be removed by screening, since it is usually substantially larger in particle size than the non-sulfur fraction of the solids phase.

Although the reaction mechanism is not precisely understood and no limitation herein is intended regarding the import of the present invention, it is believed that essentially all metal sulfide present is converted with concomitant sulfuric acid and oxygen consumption to the corresponding metal sulfate or oxide and elemental sulfur, except that cuprous sulfide and probably lead sulfide are oxidized with additional oxygen consumption to the corresponding sulfates. In the case of nitric acid regeneration and sulfur oxidation, the following types of reactions are suggested for the pressure leaching step:

Regeneration of nitric acid:

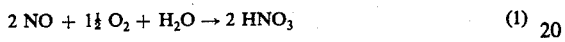

Sulfur oxidation:

From the foregoing it is clear that to the extent that sulfur oxidation per reaction (2) can be minimized in favor of sulfuric acid consumption in the main pressure leaching reaction, the oxygen consumed will be only that required for regeneration of nitric acid per reaction (1).

Inasmuch as the nitric acid concentration used according to the invention is extremely low compared to the sulfuric acid concentration, it is surprising that the role of nitric acid as oxidizing acid in the pressure leaching can be effectively carried out, with minimized oxidation of sulfur from the metal sulfide content and correspondingly using a minimized gas zone reaction space or pressure vessel, yet with adequate nitric acid regeneration (by oxidation of the liberated nitric oxide, NO) for the main leaching reaction, considering the accompanying comparatively mild overall reaction conditions and minimal leaching times. The nitric acid thus not only serves to permit conversion of any silver, copper, zinc and mercury sulfide or oxide present in the ore material to soluble sulfate, i.e. along with some iron sulfide or oxide, but also causes attendant arsenic and antimony sulfides to be oxidized to the corresponding oxides.

In fact, by utilizing a preferred temperature of about 150° C under an oxygen overpressure of about 35 psig, the pressure leaching reaction does not tend to generate unwanted $H_2SO_4$ but rather selectively to convert essentially all of the sulfur contained in the material being treated, except perhaps for cuprous sulfide and lead sulfide, to relatively pure, readily recoverable, elemental form, yet still accomplishes the desired leaching in an efficient and essentially complete manner by preferential oxidation of liberated NO rather than of attendant sulfur.

Advantageously, therefore, the subject pressure leaching step, contemplating very low or catalytic concentrations of nitric acid and low attendant oxygen consumption at moderate total operating pressure as well as minimum gas zone requirements, is usable for the selective dissolution, e.g., of silver, copper, zinc and mercury, while any attendant lead, bismuth, antimony and arsenic remain undissolved, for highly efficient separation and recovery of essentially 90 or 95% of such desired metals, without sulfur oxides polluting the atmosphere or expensive consumption of nitric acid.

HNO₃ REMOVAL AND SILVER PRECIPITATION

In accordance with a further feature of the present invention, where the metal bearing mineral material is a silver bearing mineral material, e.g. tetrahedrite, and silver values are pressure leached therefrom, in the foregoing manner, the silver can be advantageously cemented substantially completely from the solution, thereby conveniently separating the same from any still dissolved content of other metals leached from the ore, e.g. copper, zinc, mercury and/or iron. Specifically, the aqueous liquid, containing the silver and any copper or other metal values pressure leached from the mineral material, is thereafter contacted with metallic copper at about 100°–125° C in a closed system under autogenous steam pressure of about 0–15 psig, to reduce the remaining nitric acid values to gaseous form, and the gaseous form nitric acid values are removed from the closed system and silver metal deposition from the aqueous liquid and copper metal dissolution into such aqueous liquid are simultaneously effected by displacement or cementation.

Of course, in its broad aspects this feature concerns a process for recovering silver by cementation from an acidic aqueous liquid containing dissolved silver values, sulfuric acid values and residual nitric acid values, which comprises contacting such acidic aqueous liquid with metallic copper at about 100°–125° C in a closed system under autogenous steam pressure of about 0–15 psig, to reduce the residual nitric acid values to gaseous form, and under such temperature and pressure conditions removing such gaseous form nitric acid values from the closed system and simultaneously effecting by displacement the deposition of the silver values as metallic silver from the aqueous liquid and the dissolution of metallic copper into said aqueous liquid. While the aqueous liquid may optionally further contain dissolved therein at least one of the group of copper, zinc, mercury and iron values, it is preferably substantially free from contaminating lead, arsenic, antimony, bismuth and manganese values, especially where the resulting solution is to be subjected to electro-winning work-up to recover any copper content therein.

In this regard, while it has been long known to use metallic copper industrially to cement silver out of solution, the presence of nitric acid in the silver solution, even at low HNO₃ concentration levels, makes impossible the practical use of the cementation technique or at least drastically reduces the efficiency of silver removal by this copper displacement method. By way of the present invention, copper metal (plate, powder, strip or other form) from any appropriate source is added to the silver bearing solution, and then the contents are heated in a closed vessel to a temperature slightly above the boiling point of the solution. This causes the nitric acid to undergo reduction to gaseous form (nitric oxide) and in such form the same is readily removed from the solution system by venting. The nitric acid values so removed surprisingly allow the cementation of the silver to proceed in a normal fashion in the residual sulfuric acid solution. Silver cemented from solution in this manner is metallic in form and requires no further reduction during any subsequent refining step.

Although it is not intended to limit the import of this feature of the present invention in any way, one possible theoretical explanation for the overall silver cementation from a mixed sulfuric acid-nitric acid metal-containing solution suggests itself. The main silver cementation reaction is as follows:

$$2 Ag^+ + Cu \rightarrow 2 Ag \downarrow + Cu^{++} \quad (3)$$

However, the action of nitrate ion on copper metal in an acid solution such as under elevated temperature and pressure conditions, may occur as follows:

$$8 H^+ + 2 NO_3^- + 3 Cu \rightarrow 3 Cu^{++} + 2 NO \uparrow + 4 H_2O \quad (4)$$

If it is considered that reaction (4) precedes reaction (3) or at least initiates the reduction of $HNO_3$ to gaseous form to the extent that reaction (3) can incrementally take place as inhibiting $HNO_3$ is reduced and removed from the solution (i.e. vented from the closed system) via reaction (4), then an overall plausible scheme for the results obtained is as follows:

$$Ag_2SO_4 + 4 Cu + 3 H_2SO_4 + 2 HNO_3 \rightarrow 2 Ag \downarrow + 4 CuSO_4 + 2 NO \uparrow + 4 H_2O \quad (5)$$

In reaction (5) of course, the starting silver sulfate, sulfuric acid and nitric acid are actually in ionized form in the solution, and the copper sulfate formed is in similar condition. It will be seen that this overall scheme results in a depletion of the sulfuric acid content as well, which reduces the acidity level of the cemented solution. Since the constituents are maintained under slight positive pressure during the heating in the initially unvented closed system, the nitric acid content does not merely boil off but apparently and surprisingly undergoes an oxidation of the metallic copper for its more complete chemical removal as an inhibiting agent suppressing the desired silver comentation reaction, followed by a physical removal of the resulting nitric oxide (NO) by venting while still maintaining the elevated temperature and pressure conditions in the otherwise closed system.

Advantageously, the nitric acid values so removed are regenerated by oxidation for reuse in the overall operation as desired.

On the other hand, the dissolved silver may be removed from the pressure leaching solution by any other well-known technique such as by precipitation with chloride. In the latter instance, for example, a soluble chloride is added according to one industrial process in an amount sufficient to provide the chloride anions necessary to combine with the silver cations to form silver chloride, a highly insoluble, and usually quite pure, precipitate. This precipitate is filtered, washed and treated, usually in a furnace, to convert the same to silver metal.

As to any attendent copper in the pressure leaching solution, once the silver content has been advantageously removed in one of the foregoing ways, conventional electro-winning or cementation techniques may be employed to attain copper recovery in due course. Any zinc or mercury values can also be recovered, if desired, by conventional work-up techniques.

It will be realized that the final or spent aqueous liquid or pressure leaching solution, from which all desired metal values has been recovered. e.g. by conventional technique, may be advantageously used, alone or with fresh make-up solution as may be necessary, as the aqueous liquid for the acid pretreatment step, rather than be merely discarded. For this purpose, the sulfuric acid and/or nitric acid contents can be adjusted as and if necessary to conform to the aforementioned concentrations. In fact, by suitable recycling, after appropriate sulfuric acid and/or nitric acid adjustment in the same way, the final metal-depleted aqueous liquid or pressure leaching solution, may be used, alone or with fresh make-up solution as may be necessary, as the aqueous liquid for the pressure leaching step itself.

Of course, similarly, the resultant weakly acidic aqueous liquid from the acid pretreatment step, which contains certain unwanted metals such as manganese and iron, need not be immediately discarded but can be recycled, after acid adjustment as and if necessary, until rich in manganese and iron to the extent that the desired acid pretreatment would be adversely affected by its further recycling. On the other hand, it can be processed as well in the conventional manner to recover the sulfuric acid and nitric acid values therein for reuse in the overall operation, either by way of recycling only the recovered acid values to the acid pretreatment step itself or by introducing the same into the pressure leaching aqueous liquid system, as the artisan will appreciate.

Periodically, of course, solutions which have been used within a particular circuit herein, either on a batch or continuous basis, will ultimately become contaminated with metal values which are not recovered and which therefore accumulate in the system. These bleed solutions are discarded as waste liquids in the usual way. However, the fact that the present process lends itself to recycling, regeneration and repeated use of the aqueous liquids and recovered gaseous products (principally NO and even $O_2$), so as to prolong the conservation of the sulfuric acid and nitric acid values and minimize disposal problems for such final bleed solutions, represents a distinct advantage of the present invention. This is especially true, considering the very low nitric acid quantities contemplated and their efficient regeneration, as well as the ability to suppress oxidation of elemental sulfur to sulfuric acid by reason of the selective pressure and temperature conditions usable, i.e. in conjunction with such low nitric acid quantities, and the resultant minimization of sulfuric acid-containing spent liquors which must be disposed of as compared with the readily disposable elemental sulfur solid particles of high purity.

The following examples are set forth by way of illustration and not limitation of the present invention. All quantities are by weight unless specifically stated otherwise.

EXAMPLE I (ACID PRETREATMENT)

370 Grams of an ore concentrate (tetrahedrite), containing 5.1% silver, 27% copper, 19% antimony, 10% iron, 27% sulfur, 2.5% zinc, 0.28% manganese, and minor amounts of arsenic, lead and bismuth, were dispersed in a solution containing 92 grams (0.939 mol) of $H_2SO_4$, 2 grams (0.0317 mol) of $HNO_3$ and 1450 grams of water. Such solution contained 63.45 g/l $H_2SO_4$ (about 6% concentration) and 1.38 g/l $HNO_3$ (about 0.14% concentration) in a weight ratio of 46:1 and a molar ratio of 29.6:1. The resulting slurry containing a solids to aqueous liquid weight ratio of 0.24:1 was heated to a temperature of 90° C and with agitation held at this condition (no pressure) in an open vessel for a period of 1 hour. Then the leach mass was filtered and the residue washed with water and dried.

The dried residue (undissolved concentrate) weighed 340 grams indicating a weight loss of 30 grams or about 8.1%. The separated solution including the water washings showed that essentially 100% of the manganese had been dissolved, 30% of the iron had been removed, while less than 0.5% of the copper and antimony had dissolved and none of the silver had been leached.

On the basis that the final solution contained 59 grams (calc. about 69 grams) of $H_2SO_4$ and 1.6 grams of $HNO_3$, 33 grams (calc. about 23 grams) of $H_2SO_4$ and 0.4 grams of $HNO_3$ had been consumed by the acid pretreatment for a 35.87% (calc. 25.0%) $H_2SO_4$ weight loss and 20% $HNO_3$ weight loss.

EXAMPLE II (ACID PRETREATMENT)

Example 1 was repeated exactly using in this case only 46 grams (0.469 mol) of $H_2SO_4$. Such solution contained 31.72 g/l $H_2SO_4$ (about 3% concentration) in a weight ratio to the 2 grams of $HNO_3$ present of 23:1 and in a molar ratio of 14.8:1. The resulting slurry in this instance had a solids to aqueous liquid weight ratio of almost 0.25:1.

The results were exactly the same as in Example I except that on the basis that the filtrate contained only 22 grams of sulfuric acid and 1.6 grams of nitric acid, 24 grams of sulfuric acid and 0.4 grams of nitric acid had been consumed by the acid pretreatment for a 52.17% $H_2SO_4$ weight loss and 20% $HNO_3$ weight loss.

EXAMPLE III (ACID PRETREATMENT)

400 Grams of an ore concentrate (tetrahedrite), containing 0.27% silver, 20% copper, 15% antimony, 20% iron, 0.80% mercury, 28% sulfur, 0.24% manganese, and minor amount of zinc, arsenic, lead and bismuth, were dispersed in a solution containing 74 grams (0.755 mol) of sulfuric acid, 0.2 grams (0.00317 mol) of nitric acid and 1460 grams of water. Such solution contained 50.69 g/l of sulfuric acid (about 5% concentration) and 0.13699 g/l nitric acid (about 0.014% concentration) in a weight ratio of 370:1 and a molar ratio of 238:1. The resulting slurry contained a solids to aqueous liquid weight ratio of 0.26:1. The solid material was leached in this solution for a period of 1 hour at 90° to 95° C. Then the leach mass was filtered and the residue washed with water and dried.

The untreated (undissolved concentrate) residue after drying weighed 352 grams indicating a 12% weight loss (about 48 grams). The separated solution including the water washings showed that 100% of the manganese and 23% of the iron had been removed while only 1.2% of the copper had been removed along with less than 0.5% of the antimony. None of the silver or mercury had been dissolved.

About 8–9.5 g of sulfuric acid are generally consumed per 100 g concentrate charged, according to this type acid pretreatment procedure, or about 36 g based on the 400 g of starting ore, whereas about half of the nitric acid appears generally to be consumed, probably due to reaction with the copper content which is removed, leaving about 0.1 g free nitric acid in the final solution (roughly 49% $H_2SO_4$ weight loss and generally 50% $HNO_3$ weight loss).

EXAMPLE IV (ACID PRETREATMENT)

Example 3 was repeated exactly except that in this case the leaching was carried out at 20° C. All of the Example 3 results were duplicated.

The results of Examples 1 to 4 demonstrate that the sulfides present in the ore concentrate essentially remain unleached while the carbonates are effectively removed, whereas at undesirably higher nitric acid concentrations, e.g. in excess of 4.0 g/l, 1% or more of the copper present is leached even though silver remains unleached. As aforesaid, generally about 8–9.5 g of sulfuric acid are consumed per 100 g concentrate charged.

EXAMPLE V (PRESSURE LEACHING)

340 Grams of acid pretreated concentrate, as obtained per Example I, were mixed into a solution containing 550 grams (5.61 mols) of $H_2SO_4$, 7 grams (0.111 mol) of $HNO_3$ and 2700 grams of water. Such solution contained 203.7 g/l $H_2SO_4$ (about 18% concentration) and 2.59 g/l $HNO_3$ (about 0.26% concentration) in a weight ratio of 78.7:1 and a molar ratio of 50.5:1. The resulting slurry containing a solids to aqueous liquid weight ratio of 0.10:1 was placed in a pressure leaching vessel (autoclave), adapted for agitation of its contents, and charged with 90 pounds per square inch gage (psig) oxygen. This is equivalent to 35 psig oxygen overpressure at 150° C. The contents in the closed system were heated under agitation to 150° C with constant addition of oxygen to maintain 90 psig total pressure (steam pressure 55 psig; oxygen pressure 35 psig). Leaching was continued for 2 hours at 150° C under such pressure conditions. The resulting leaching solution was separated from the remaining solids residue including elemental sulfur particles formed during the pressure leaching. The solids residue was separated from the larger sulfur particles by screening the leached pulp through a 60 mesh Tyler Screen and the screened residue was then dried.

The results indicated that in excess of 95% of the copper and zinc and 90% of the silver had dissolved into the leaching solution, apparently along with some of the iron. The antimony and arsenic were undissolved, yet converted from sulfides to oxides, with the lead and the rest of the iron remaining in the undissolved material (solids residue), although in sulfate form. The bismuth was also undissolved. The dry solids residue excluding sulfur weighed 180 grams. The screened off elemental sulfur particles, i.e. larger than 60 mesh, were washed with water and weighed 85 grams on a dry basis, indicating that approximately 15 grams of sulfur or about 15%, excluding any sulfur remaining in the solids residue such as that combined with lead or iron in sulfate form, had been converted to sulfuric acid. The elemental sulfur product was approximately 95% pure sulfur. The indicated sulfuric acid consumption was 85 grams and the nitric acid unregenerated was about 1.5 grams.

On the basis that 15 grams of sulfur, upon oxidation, produced about 45.94 grams $H_2SO_4$ during the pressure leaching-oxidation, e.g. corresponding in amount to sulfide sulfur (e.g. $Cu_2S$ and $PbS$) oxidized to sulfate sulfur, this supplemental amount plus the aforesaid 85 grams of original $H_2SO_4$ consumed, totaling 131 grams $H_2SO_4$ (calc. about 98 grams), represents the actual sulfuric acid consumption based on the original 550 grams of starting $H_2SO_4$ as so supplemented, leaving a final $H_2SO_4$ content of 430 grams. Based on the original 7.0 grams of $HNO_3$, the 1.5 grams $HNO_3$ consumed during the pressure leaching-oxidation and not regenerated leaves a final $HNO_3$ content of 5.5 grams. The resulting adjusted weight loss of $H_2SO_4$ is thus 23.8% and that of $HNO_3$ is 21.43%.

As compared with the constant weight loss of 20% $HNO_3$ using 1.38 g/l $HNO_3$ (about 0.14% concentration) under the mild temperature open air conditions of the acid pretreatment leaching of Examples I and 2, even though in Example 2 only ½ of the $H_2SO_4$ quantity of Example I was used, it is indeed surprising that under the closed system pressure leaching-oxidation of present Example 5 using 2.59 g/l $HNO_3$ (about 0.26% concentration) a corresponding weight loss of only 21.43% $HNO_3$ occurred. This is particularly significant in view of the much higher quantities of the constituents converted in Example 5 as compared with Examples I and 2.

Upon repeating Example 5 with the corresponding original ore concentrate of Example 1 without the acid pretreatment step thereof, i.e. at 150° C for the same pressure leaching time, but at a higher total pressure of 140 psig (indicating a significantly higher overpressure due to not only the partial pressure of oxygen but also that of released carbon dioxide), only about 65% rather than 90% silver recovery is attained.

EXAMPLE VI (PRESSURE LEACHING)

352 Grams of acid pretreated concentrate, as obtained per Example 3 were mixed into a solution containing 166 grams (1.69 mols) of $H_2SO_4$, 4 grams (0.063 mol) of $HNO_3$ and 2900 grams of water. Such solution contained 57.2 g/l $H_2SO_4$ (about 6% concentration) and 1.38 g/l $HNO_3$ (about 0.14% concentration) in a weight ratio of 41.5:1 and a molar ratio of 26.7:1. The resulting slurry containing a solids to aqueous liquid weight ratio of 0.11:1 was placed in a pressure leaching vessel (autoclave), adapted for agitation of its contents, and charged to 45 psig with oxygen. This is equivalent to 15 psig oxygen overpressure at 135° C. The contents in the closed system were heated under agitation to 135° C with constant supply of oxygen to maintain 45 psig total pressure (steam pressure 30 psig; oxygen pressure 15 psig). Leaching was continued for 2 hours at 135° C under such pressure conditions. The resulting leaching solution was separated from the remaining solids residue including elemental sulfur particles formed during the pressure leaching. The solids residue was separated from the larger sulfur particles by screening the leached pulp through a 60 mesh Tyler Screen as in Example 5 and the screened residue was then dried.

The results indicated that in excess of 90% of the silver, mercury and zinc had dissolved, as well as over 98% of the copper, and apparently some of the iron, while the antimony, arsenic, bismuth and lead, along with the rest of the iron, were undissolved. The antimony and arsenic, although undissolved, were converted from sulfide to oxide form. The lead and undissolved iron were converted to the insoluble sulfate form. The screened off elemental sulfur particles, recovered as in Example 5, were in excess of 95% pure sulfur and on the basis of a weight of 103 grams, there is an apparent unaccountability of 9 grams of sulfur or about 8% which was probably converted to sulfuric acid. The filtrate or leaching liquid contained 3.4 grams of nitric acid, indicating that 0.6 grams $HNO_3$ had been consumed during the pressure leaching-oxidation and that 85% of that added originally had been regenerated. The resulting weight loss of $HNO_3$ was only 15%.

Generally, about 25-30 g of sulfuric acid are consumed per 100 g concentrate charged, according to this type pressure-oxidation leaching procedure, or about 90-105 g based on the 352 g of starting ore, whereas less than one-sixth of the nitric acid is consumed, leaving about 3.4 g nitric acid in the final solution (roughly 37-54% $H_2SO_4$ weight loss and 15% $HNO_3$ weight loss).

As compared with the constant weight loss of 20% $HNO_3$ under the mild temperature open air conditions of the acid pretreatment leaching of Examples 1 and 2, especially considering that in Example 2 only ½ of the $H_2SO_4$ quantity of Example 1 was used, it is particularly surprising that under the closed system pressure leaching-oxidation of present Example 6 a lesser weight loss of only 15% $HNO_3$ occurred, despite the fact that in Examples 1, 2 and 6, the same very low 1.38 g/l $HNO_3$ quantity (about 0.14% concentration) was employed (whereas in Example 5 much higher quantities of the constituents were converted).

The lesser $HNO_3$ weight loss of 15% in Example 6 compared with the 21.43% $HNO_3$ weight loss of Example 5 would seem to suggest that, apart from the effect thereon of the difference in metal content, especially copper content, even under milder pressure and temperature regeneration conditions excellent efficiency is obtained and that generally the lower the $HNO_3$ concentration, the lower the consumption thereof without regeneration, and correspondingly that the lower $HNO_3$ concentration and milder pressure and temperature conditions of Example 6 as compared with Example 5, cause less oxidation of elemental sulfur to $H_2SO_4$ and in turn less oxygen consumption.

The results of Examples 5 and 6 demonstrate that by maintaining proper selected conditions concerning acid concentration, i.e. very low $HNO_3$ concentrations, temperature, pressure and oxygen overpressure, various metals including silver and mercury can be efficiently and economically extracted, e.g. along with copper and zinc, from metal bearing mineral materials, leaving any attendant arsenic, antimony, lead or bismuth values behind in the solids residue. Thus, using very low $HNO_3$ concentrations, such valuable metals can be extracted without extremes of pressure or temperature, but rather under relatively mild conditions inherently involving minimum gas zone requirements for supplying oxygen and achieving nitric acid regeneration according to the invention, and the operating conditions are sufficiently versatile that sulfur present in the ore concentrate, e.g. tetrahedrite or other metal bearing mineral material, need not necessarily be converted to sulfuric acid (with expensive collateral consumption of oxygen), but rather to readily separable and environmentally inert elemental sulfur of high purity and in quantitative yields. As will be understood by the artisan, increased pressure leaching times will yield ever greater silver or the like recoveries, and emphasis may be conveniently placed on milder conditions of temperature and pressure within the contemplated ranges herein for the pressure leaching-oxidation without sacrificing yield efficiency by merely compensating therefor by extending the leaching time. Generally, it is believed that the lower the nitric acid concentration, the lower the weight loss thereof, especially under milder pressure and temperature conditions, in terms of the within stated ranges.

It should be noted that where the acid pretreatment step is omitted, the sulfuric acid loss in the pressure leaching step is generally increased by an amount roughly corresponding to that required to accomplish the leaching therein of the carbonate content. However, the aforesaid prior art drawbacks attend such modified procedure, as the artisan will appreciate. Thus, whereas the total sulfuric acid consumed in a pressure leaching step including the Example 1 starting carbonate containing material is about 120 g, this is not appreciably different from the sum of that cumulatively considered to be consumed in Examples 1 and 5, yet in the latter instance the prior art drawbacks are avoided including the consumption of that quantity of oxygen which would otherwise be needed to precipitate $Fe_2O_3$ were such iron not removed by such pretreatment step.

EXAMPLE VII ($HNO_3$ REMOVAL AND SILVER PRECIPITATION)

A residual acid aqueous liquid, in the form of the resulting filtrate from Example 5, containing corresponding dissolved metals including 4.0 g/l silver and containing 1.5 g/l $HNO_3$, as well as copper, zinc and iron, was placed in a pressure vessel (autoclave) with metallic coppers (strip, powder, and plate) and heated with agitation in the closed system until a total pressure of 10 psig at about 115° C was obtained. The closed vessel was then vented, while still in a heated condition, at such a rate as to maintain such 10 psig for a period of 5 minutes. On cooling, the residual sulfuric acid solution showed a content of 0.07 g/l $HNO_3$ and a silver concentration of 0.002 g/l, indicating nearly complete removal of both nitric acid and silver from the solution. The silver was precipitated or cemented in metallic form by displacement dissolution of a corresponding quantity of the metallic coppers. This took place after $HNO_3$ removal (as nitric oxide) from the solution, the presence of $HNO_3$ therebefore inhibiting such silver cementation by copper displacement in the residual sulfuric acid solution.

The same results essentially are obtained upon repeating the procedure of Example 7 using the filtrate from Example 6, which also contains mercury, rather than from Example 5.

EXAMPLE VIII ($HNO_3$ REMOVAL AND SILVER PRECIPITATION)

Example 7 was repeated exactly except that the heating was carried out such as to provide a total pressure of 3 psig in the closed system at a temperature of about 105° C. Upon venting for 10 minutes, rather than 5 minutes, the residual sulfuric acid solution exhibited a concentration of 0.08 g/l $HNO_3$ and 0.001 g/l silver dissolved therein.

The same results occur essentially upon repeating the procedure of Example 8 using the filtrate from Example 6 rather than from Example 5.

While the foregoing specification and examples are set forth to illustrate the present invention, various modifications and changes may be made without departing from the spirit and scope of the invention which is to be limited only by the scope of the appended claims.

What is claimed is:

1. Process for recovering acid leachable metal values from metal bearing mineral material which comprises pressure leaching such metal bearing mineral material with an aqueous liquid containing about 50–260 g/l of sulfuric acid and about 0.5–5 g/l of nitric acid under oxygen pressure, to dissolve such acid leachable metal values from said mineral material into said aqueous liquid.

2. Process according to claim 1 wherein said pressure leaching is effected at about 90°–180° C for about ¼ to 4 hours in a closed system under an oxygen pressure of about 10–50 psig in excess of autogenous steam pressure.

3. Process according to claim 2 wherein said pressure leaching is effected at a mineral material solids to aqueous liquid weight ratio of about 0.03–0.4:1.

4. Process according to claim 1 wherein said sulfuric acid and nitric acid are in a weight ratio of about 52–100:1.

5. Process according to claim 1 wherein said metal bearing mineral material is silver bearing mineral material of the sulfide, oxide or mixed sulfide and oxide type and silver values are pressure leached therefrom.

6. Process according to claim 1 for recovering silver and copper values from silver and copper bearing sulfide mineral material further containing at least one of the group of zinc, mercury, lead, arsenic, antimony, bismuth and iron values, which comprises pressure leaching such silver and copper bearing sulfide mineral material with an aqueous liquid containing about 50–260 g/l of sulfuric acid and about 0.5–5 g/l of nitric acid under oxygen pressure, to dissolve substantially silver and copper values and any such zinc and mercury values and a part of any such iron values into said aqueous liquid without dissolving substantially any such lead, arsenic, antimony and bismuth values present in said mineral material, and separating the resulting aqueous liquid from attendant undissolved mineral material and values including elemental sulfur solids.

7. Process according to claim 6 wherein said pressure leaching is effected at about 90°–180° C for about ¼ to 4 hours in a closed system under an oxygen pressure of about 10–50 psig in excess of autogenous steam pressure, and at a mineral material solids to aqueous liquid weight ratio of about 0.03–0.4:1.

8. Process according to claim 1 wherein said metal bearing mineral material is an acid pretreated mineral material from which acid soluble metal carbonates have been removed by acid pretreatment.

9. Process according to claim 8 wherein said mineral material is tetrahedrite.

10. Process according to claim 1 wherein said metal bearing mineral material is acid pretreated by preliminary leaching with an aqueous liquid containing about 30–120 g/l of sulfuric acid and about 0.05–1.5 g/l of nitric acid in an open system at ambient pressure, to dissolve substantially attendant acid soluble metal carbonate values from said mineral material prior to said pressure leaching thereof.

11. Process according to claim 10 wherein said preliminary leaching is effected at about 20°–100° C for about ¼ to 3 hours, and at a mineral material solids to aqueous liquid weight ratio of about 0.05–0.7:1.

12. Process according to claim 1 wherein said metal bearing mineral material is silver bearing mineral material and silver values are pressure leached therefrom, and wherein the aqueous liquid containing the silver values pressure leached from said mineral material is thereafter contacted with metallic copper at about 100°–125° C in a closed system under autogenous steam pressure of about 0–15 psig, to reduce the remaining nitric acid values to gaseous form, and the gaseous form nitric acid values are removed from said closed system and silver metal deposition from said aqueous liquid and copper metal dissolution into said aqueous liquid are simultaneously effected by displacement.

13. Process according to claim 1 for recovering silver and copper values from silver and copper bearing sulfide mineral material further containing at least one of the group of zinc, mercury, lead, arsenic, antimony, bismuth and iron values, and acid soluble metal carbonate values, which comprises acid pretreating such mineral material by preliminary leaching with aqueous liquid containing about 30–120 g/l of sulfuric acid and about 0.05–1.5 g/l of nitric acid at about 20°–100° C for about ½ to 3 hours in an open system at ambient pressure, and at a mineral material solids to aqueous liquid weight ratio of about 0.05–0.7:1, to dissolve substantially attendant acid soluble metal carbonate values from said mineral material into such preliminary leaching aqueous liquid, pressure leaching the resulting acid-pretreated mineral material with an aqueous liquid containing about 50–260 g/l of sulfuric acid and about 0.5–5 g/l of nitric acid at about 90°–180° C for about ½ to 4 hours in a closed system under an oxygen pressure of about 10–50 psig in excess of autogenous steam pressure, and at a mineral material solids to aqueous liquid weight ratio of about 0.03–0.4:1, to dissolve substantially said silver and copper values and any such zinc and mercury values and a part of any such iron values from said mineral material into said pressure leaching aqueous liquid without dissolving substantially any such lead, arsenic, antimony and bismuth values present in said mineral material, and separating the resulting pressure leaching aqueous liquid from attendant undissolved mineral material and values including elemental sulfur solids.

14. Process according to claim 13 wherein the separated resulting aqueous liquid is thereafter contacted with metallic copper at about 100°–125° C in a closed system under autogenous steam pressure of about 0–15 psig, to reduce the remaining nitric acid values to gaseous form, and the gaseous form nitric acid values are removed from said closed system and silver metal deposition from said aqueous liquid and copper metal dissolution into said aqueous liquid are simultaneously effected by displacement.

15. Process for acid pretreating metal bearing mineral material to dissolve preliminarily attendant acid soluble metal carbonate values therefrom which comprises preliminarily leaching such mineral material with an aqueous liquid containing about 30–120 g/l of sulfuric acid and about 0.05–1.5 g/l of nitric acid in an open system at ambient pressure, and recovering the leached solids from the preliminary leaching liquid.

16. Process according to claim 15 wherein the preliminary leaching is effected at about 20°–100° C for about ½ to 3 hours, and at a mineral material solids to aqueous liquid weight ratio of about 0.05–0.7:1.

17. Process according to claim 16 wherein said mineral material is tetrahedrite.

18. Process according to claim 17 wherein said mineral material contains acid soluble manganese values.

19. Process for recovering silver from an acidic aqueous liquid containing dissolved silver values, sulfuric acid values and residual nitric acid values, which comprises contacting such acidic aqueous liquid with metallic copper at about 100°–125° C in a closed system under autogenous steam pressure of about 0–15 psig, to reduce the residual nitric acid values to gaseous form, and removing said gaseous form nitric acid values from said closed system and simultaneously effecting by displacement the deposition of the silver values as metallic silver from said aqueous liquid and the dissolution of metallic copper into said aqueous liquid.

20. Process according to claim 19 wherein said aqueous liquid further contains dissolved therein at least one of the group of copper, zinc, mercury and iron values and is substantially free from lead, arsenic, antimony, bismuth and manganese values.

* * * * *